Patented Aug. 7, 1923.

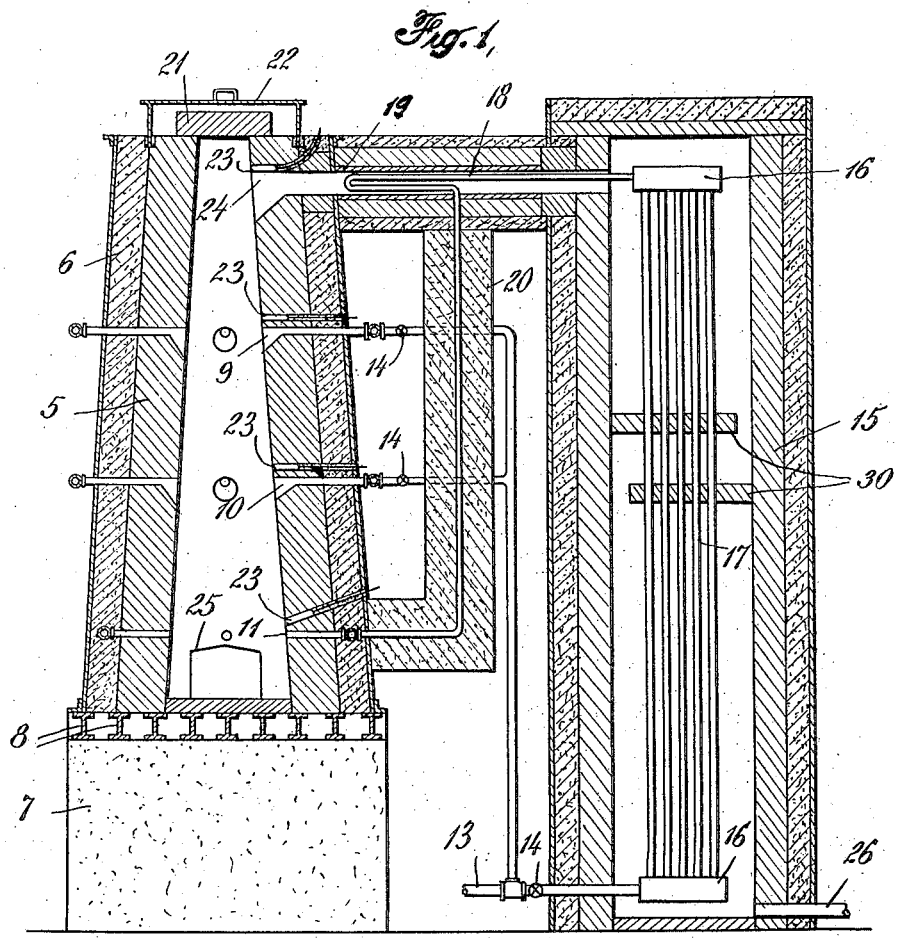

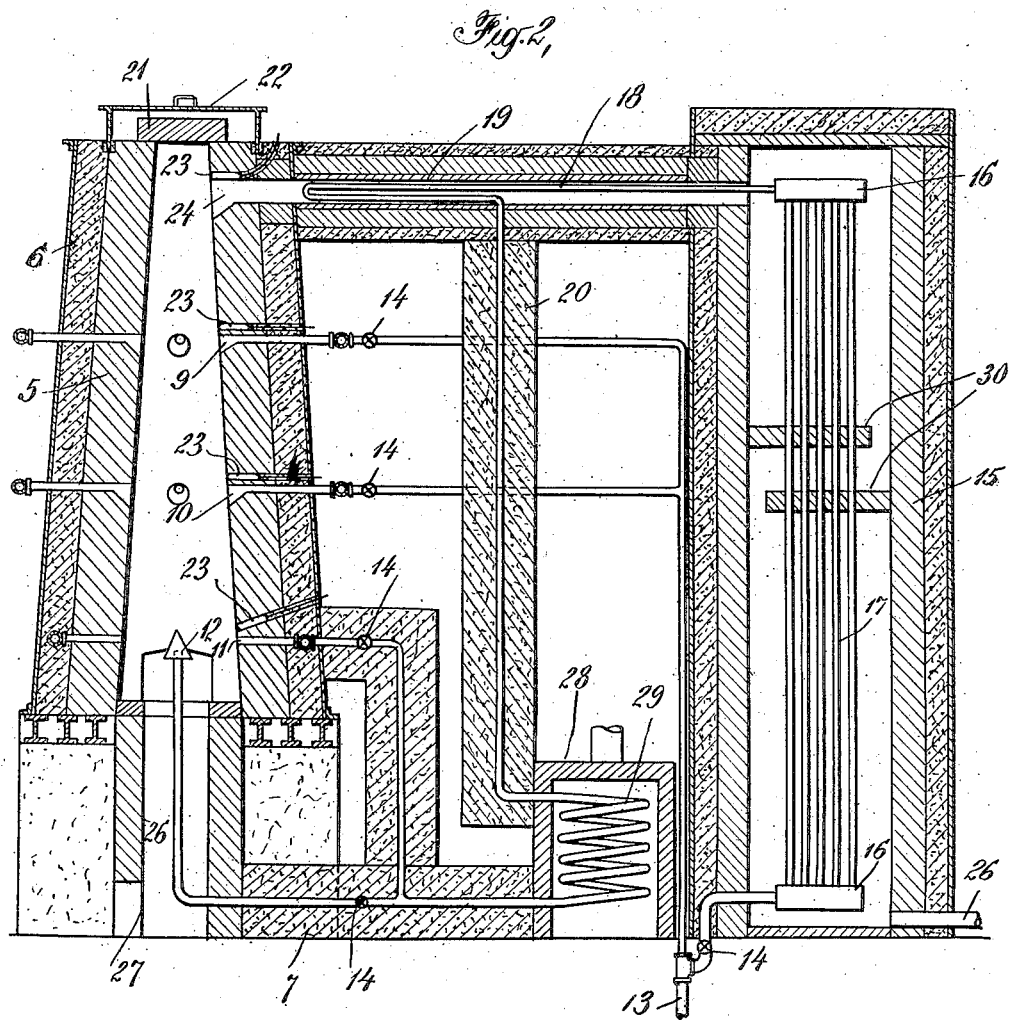

1,463,867

UNITED STATES PATENT OFFICE.

FRANK G. BREYER, JOHN P. HUBBELL, AND DUNCAN M. KERR, OF PALMERTON, PENNSYLVANIA, ASSIGNORS TO THE NEW JERSEY ZINC COMPANY, OF NEW YORK, N. Y., A CORPORATION OF NEW JERSEY.

ROASTING SULPHIDE ORES.

Application filed February 7, 1922. Serial No. 534,696.

*To all whom it may concern:*

Be it known that we, FRANK G. BREYER, JOHN P. HUBBELL, and DUNCAN M. KERR, residing at Palmerton, county of Carbon, State of Pennsylvania, have invented certain new and useful Improvements in Roasting Sulphide Ores; and we do hereby declare the following to be a full, clear, and exact description of the invention, such as will enable others skilled in the art to which it appertains to make and use the same.

This invention relates to the desulfurizing of zinciferous sulphide ores, and has for its object the provision of an improved method of desulfurizing such ores.

Zinciferous sulphide ores, as mined, contain, in addition to zinc sulphide or blende, varying amounts of other metalliferous sulphides, such as galena, pyrite, and the like, as well as varying amounts of gangue constituents. The raw ore, crushed to suitable size for the particular mode of ore dressing employed, is usually subjected to appropriate treatment, such as jigging, tabling, magnetic separation, flotation, etc., for eliminating to the desired extent the gangue constituents and, in some instances, one or more of the metalliferous constituents other than zinc sulphide. The zinciferous sulphide concentrates resulting from such customary modes of ore dressing are in a finely divided condition varying, according to the particular mode of concentration employed, from one fourth inch mesh and finer, in the case of jig concentrates, to one one-hundredth inch mesh and finer, in the case of flotation concentrates.

The present invention contemplates an improved method of desulfurizing or roasting zinciferous sulphide ores or concentrates in a finely divided condition, that is, of one-fourth inch mesh and finer. Throughout this specification and the appended claims the expression "zinciferous sulphide ores" is to be understood as including raw ores, concentrates, or other materials containing a relatively high percentage of zinc sulphide or blende. In addition to zinc sulphide or blende, the zinciferous sulphide ore, concentrate, or other material, may, and usually does, contain other metalliferous constituents such as galena, pyrite, etc., and it is to be understood that the method of the invention is applicable to the treatment of zinciferous sulphide materials containing other metalliferous constituents, generally in relatively small percentages, such as are ordinarily present in zinciferous sulphide ores or concentrates.

Zinciferous sulphide ores have heretofore been desulfurized or roasted by various processes and in various forms of apparatus such, for example, as shaft furnaces, reverberatory furnaces, muffle furnaces, etc. The complete elimination of the sulfur from such ores, even if desirable, is substantially impracticable under commercial operating conditions, and it is customary in the art to regard the ore as sufficiently roasted or desulfurized for any subsequent metallurgical treatment when its fault sulfur content is reduced to 3% and preferably to less than 2%, in which condition the ore is said to be dead-roasted or sweet-roasted. As is well understood in the art, the fault sulfur is the sulfur in the roasted or desulfurized product which might have been driven off under ideal roasting conditions. The partial desulfurization of zinciferous sulphide ores can be effected with little practical difficulty and without the application of external heating, but, as far as we are aware, it has heretofore been the general practice in dead-roasting zinciferous sulphide ores to effect the last stages of the desulfurization by the application of external heat, and we know of no method heretofore successfully used in practice for autogenously dead-roasting zinciferous sulphide ores.

Where the sulphide dioxide gases resulting from the desulfurization of the ore are employed in the manufacture of sulfuric acid, it is difficult in the heretofore customary processes of desulfurization to maintain uniformity in the sulfur dioxide content of the resulting gases because such gases are richer in sulfur dioxide during the earlier stages of the desulfurization than during the latter stages, and more particularly because the raking of the ore charge is generally intermittent and the gas is much richer immediately following the periods of raking. This is a very serious difficulty in the manufacture of sulfuric acid, because the most satisfactory and efficient conditions for sulfuric acid manufacture require the supply of a gas of a substantially uniform temperature and sulfur dioxide content. The present invention contemplates a method of desulfurization which is of special advantage in this respect.

The desulfurization or roasting of zinciferous sulphide ores may be regarded as ideal or 100% efficient from the acid as well as the washing standpoint where—

1. There is complete control of the amount of sulfur left in the calcine;
2. No fuel is used but the ore itself;
3. A roasted ore is produced whose physical properties are satisfactory for further metallurgical treatment;
4. A gas most desirable for acid manufacture (6–8% $SO_2$) is produced;

While the ignition temperature of zinc sulphide is around 600° C., and consequently a temperature of over 600° C., in the roasting zone should theoretically be ample for effecting the desired desulfurization of the ore, we have found in practice that the most satisfactory desulfurizing temperature is between 860° C. and 1000° C. As is commonly understood in the art, the difficulty in roasting zinc blend lies in preventing the temperature from rising too high in the earlier stages of the desulfurization, when the amount of fuel (sulfur) in the ore is relatively high and desulfurization is most active, while at the same time maintaining in the ore sufficient heat to complete the desired desulfurization during the later stages thereof when the amount of fuel (sulfur) in the ore become so depleted as to furnish too little heat to maintain its own combustion, as well as maintaining, during the later stages of desulfurization, a sufficiently high temperature to prevent the formation of sulfates and to decompose those which may have formed.

Our improved method of desulfurizing zinciferous sulphide ores, when carried out in accordance with our preferred practice, more closely approximates the aforementioned ideal conditions of desulfurization than any other method now known to us. In its preferred and complete aspect the method of the invention involves agglomerating finely divided zinciferous sulphide ore into porous lumps of substantial size and subjecting the agglomerated ore to a regulated desulfurizing environment for effecting the desired elimination of sulfur from the ore with the production of a roasted or desulfurized product containing not over three per cent of fault sulfur and the production of a gaseous product of substantially uniform sulfur dioxide content of from about 5% to about 8%. The agglomeration of the ore may be effected by briquetting, by sintering, or by any other appropriate procedure adapted to produce porous agglomerates of the finely divided ore. In carrying out the invention, the agglomerated ore is caused to travel through an appropriate desulfurizing environment which is maintained by passing through the agglomerated ore, preferably in a direction opposite to the direction of travel of the ore, a combustion supporting gas (such as air) at least a portion of which is preheated, preferably in part at least by the hot products resulting from the desulfurization. The combustion supporting gas is preferably introduced into the agglomerated ore at two, or more, different stages in the desulfurization, the portion of the combustion supporting gas introduced into the ore at a later stage in the desulfurization being at a considerably higher temperature than the portion of the combustion supporting gas introduced into the ore at an earlier stage in the desulfurization.

The desulfurization of the agglomerated ore may advantageously be carried out in a well insulated shaft furnace, preferably of tapered section (larger at the bottom than at the top), and provided with two or more sets of tuyères appropriately distributed at different levels between the top and bottom of the furnace. Air (or other appropriate combustion supporting gas) preheated to a temperature preferably around 650° C., and generally in amount from about one-third to two-thirds of the total air required for the desulfurizing operation, is introduced into the furnace through the lower set or sets of tuyères, and cold air (at or about atmospheric temperature), and generally in amount from about two-thirds to one-third of the total air required for the desulfurizing operation, is introduced through the upper set or sets of tuyères. The porous lumps of agglomerated ore and the air for desulfurizing pass through the furnace in counter-current direction, in the course of which the air passes upwardly through the agglomerated ore, and the agglomerated lumps of ore pass progressively downward through the shaft furnace, whereby the freshly charged ore while rich in fuel value, is subjected to the combined preheated and cold air introduced into the furnace through all of the sets of tuyères, and later, when more or less depleted of fuel value, the agglomerated ore is subjected only to preheated air introduced into the furnace through the lower set or sets of tuyères. The exit gases resulting from the desulfurizing operation are withdrawn from near the top of the furnace and the heat thereof is employed for preheating the air supplied to the lower set or sets of tuyères.

The exit gases from the desulfurizing operation have a very uniform sulfur dioxide content of from 5 to 8%, which is a marked improvement over the heretofore customary processes of roasting zinciferous sulphide ores, the exit gases in these prior processes having a very non-uniform sulfur dioxide content varying on the same furnace from as low as 1% to as high as 7% but averaging about 3½%. The exit gases produced in the practice of the invention, after giving up a certain amount of their heat in preheating the air introduced into the desulfurizing furnace through the lower set or sets of tuyères as aforementioned, are advantageously utilized in the manufacture of sulfuric acid.

While it is our present preferred practice to carry out the method of the invention in a shaft furnace, we wish it to be understood that the desulfurizing process of the invention may be carried out in other types of furnace, such, for example, as straight line furnaces with traveling hearths (or cars or wagons) or in rotary hearth or in rotary kiln types of furnaces. For the purposes of explanation, we will proceed to a more detailed description of the practice of the invention as carried out in a shaft furnace of the type and construction illustrated in the accompanying drawings in which Figures 1 and 2 are elevations, partly in section, of two furnace structures and their appurtenances which we have found admirably adapted for the practice of the invention.

In the practice of the invention as hereinafter particularly described, the finely divided zinciferous ore is agglomerated by briquetting, but we wish it to be understood that the process of the invention is not limited to the treatment of ore in the form of briquettes but, on the contrary, contemplates the desulfurization of finely divided zinciferous sulphide ore artificially agglomerated in other ways, such, for example, as by sintering the finely divided ore, with subsequent crushing, if necessary, of the sintered product to lumps of suitable size for desulfurization in accordance with the invention. The briquetted, or otherwise artificially agglomerated, material should possess sufficient mechanical strength to withstand without crumbling or breaking the handling incident to storage, conveying to the furnace and to charging into the furnace either by hand or otherwise. Moreover, it is desirable that the agglomerated material possess such resistance to crumbling or breaking as to enable the briquettes or other agglomerates to substantially maintain their original form during the entire furnacing operation, so that they are, for the greater part, discharged from the furnace in substantially their original physical form, and without the formation of an objectionable amount of fines.

We have secured excellent results in briquetting finely divided zinciferous sulphide ore in the following manner. The finely divided ore together with a suitable binder (preferably concentrated waste sulfite liquor of the sulfite paper pulp industry) is placed in a revolving mixer of the kind employed for the mixing of concrete, and therein mixed until the binder is thoroughly incorporated throughout the ore mass. From 3% to 5% (on the weight of the ore) of the concentrated waste sulfite liquor of 30% Baumé is a satisfactory amount to employ for binding purposes. From the aforementioned mixer, our customary practice is to dump the material into a dry pan Chilean mill or edge-runner and to subject the material to the mixing and comminuting action of the mill for three minutes or more. From the Chilean mill the material is taken to a briquetting press. The form of press that we have used to advantage consists of cooperating rolls provided with cooperating molding pockets so that when the material is fed into the pans of the rolls from above it is molded into briquettes of predetermined shape and dimensions. The two rolls of the briquetting press are held together by heavy spring pressure so as to exert a compressive force upon the material, as it is being formed into the briquettes, of about 2000 pounds to the square inch. The briquettes are next dried at a temperature of approximately 200° C. for a period of from 1 to 2 hours. The dried briquettes are then cooled and stored under cover for subsequent use.

The size of the briquettes bear a definite relationship to the size of the furnace and the speed with which the charge passes through the furnace. Where the ore is to be dead or sweet roasted, the size of the briquette should be so proportioned with respect to the size of the furnace and the speed with which the charge passes therethrough that the desulfurization penetrates uniformly to the center of the briquette leaving no unroasted portion or core within the briquettes. With a shaft furnace about 16 feet in height having a tapered roasting chamber of circular section about 2½ feet in diameter at the bottom and about 1½ feet in diameter at the top, we have secured excellent results with briquettes weighing approximately 2 to 3 ounces, the briquettes passing through the furnace in about 24 hours. With larger furnaces, or with slower progress of the charge throughout the furnace, larger briquettes may be used, and we have successfully dead roasted by the process of the invention briquettes weighing approximately 5 to 6 ounces.

Referring now to Fig. 1 of the accompanying drawings, there is diagrammatically represented a shaft furnace constructed for the most part of fire brick 5 surrounded by a comparatively thick layer 6 of heat insulating material, such, for example, as sil-o-cel. The furnace structure is supported on concrete pillars 7 and I-beams 8.

The shaft furnace is provided with three sets of tuyères 9, 10 and 11 arranged to introduce air or other appropriate combustion supporting gas into the roasting chamber at three different levels. The two upper sets of tuyères 9 and 10 are directly connected to the air main 13 and serve to introduce air at atmospheric temperature, or thereabouts, into the roasting chamber at two different levels. The relative amount of cold air introduced into the roasting chamber through the tuyères 9 and 10 can be regulated by the valves 14.

The lower tuyères 11 are connected to the air main 13 through a well insulated preheater 15. The air circuit of this preheater comprises a pair of spaced headers 16 connected by a plurality of vertical pipes 17, and a pipe 18 communicating with the upper header 16 and passing into the conduit 19 for the exit gases of the desulfurizing operation. From the conduit 19 the hot air pipe 18 passes to the tuyères 11 and is thoroughly insulated by a relatively thick packing of heat insulating material 20. A pair of horizontally disposed and spaced baffles 30 are preferably arranged in the preheater to keep the top part of the chamber as hot as possible by preventing radiation downward.

In practicing the method of the invention in the apparatus illustrated in Fig. 1 of the drawings, the agglomerated ore is fed into the shaft furnace through the top. The top of the furnace is normally closed by a thick tile 21 and a sand-sealed cover 22. Under normal operating conditions the shaft furnace is entirely filled with the agglomerated ore, the sulfur content of the ore varying from a maximum to a minimum from the top of the furnace toward the bottom. Hot air, preheated to a temperature of from about 400°–800° C., is introduced into the agglomerated ore through the lower set of tuyères 11. In practice, we find that from about one-third to about two-thirds of the total air required for the desulfurizing operation should be preheated and introduced into the agglomerated ore through the lower set or sets of tuyères. Cold air, that is at or about atmospheric temperature, is introduced into the agglomerated ore through either or both of the upper sets of tuyères 9 and 10.

Pyrometers 23, preferably of the thermocouple type, are appropriately disposed to indicate the temperature at various levels within the shaft furnace. We prefer to arrange these pyrometers in proximity to each of the sets of tuyères, and also to arrange one pyrometer in proximity to the outlet flue 24 for the exit gases. In Figure 1 of the drawing the pyrometers are only diagrammatically indicated, but it is to be understood that these pyrometers are appropriately connected to indicate the temperatures within the shaft furnace at which they are respectively located. Preferably, the indications of the pyrometers are recorded on a time-actuated record sheet in order to facilitate the proper control of the desulfurizing operation from the pyrometric indications.

In carrying out the invention a regulated desulfurizing environment is maintained within the shaft furnace by appropriately regulating the relative amounts of air introduced into the furnace through the three sets of tuyères 9, 10 and 11. From the readings of the pyrometers 23, the relative amounts of air introduced into the agglomerated ore in its progressive travel through the shaft furnace are so controlled and regulated as to maintain the temperature of the agglomerated ore during the desulfurizing operation above 760° C., the aim being in this control and regulation to maintain the agglomerated ore throughout the entire desulfurizing operation as nearly as possible at the optimum temperature of from 800° C. to 1000° C.

The roasted or desulfurized product is withdrawn from the bottom of the shaft furnace through doors 25. It will, of course, be understood that the charging and discharging of the furnace may be carried out in a continuous manner, rather than intermittently as represented by the furnace construction of Fig. 1. The hot gaseous products from the desulfurization pass from the furnace through the outlet flue 24 and conduit 19 into the preheater 15 where they come in intimate contact with the elements 16, 17 and 18 of the air circuit of the preheater. From the preheater the gaseous products pass through a flue 26 and may advantageously be utilized in the manufacture of sulfuric acid.

A slightly modified arrangement of apparatus for practicing the method of the invention is diagrammatically indicated in Fig. 2 of the drawings. Similar elements in the apparatus of Figs. 1 and 2 are indicated by the same reference characters. The apparatus of Fig. 2 is provided with an additional hot air tuyère 12 on substantially the same level as the tuyères 11 but centrally disposed within the interior of the shaft furnace. The furnace itself is constructed to enable the withdrawal from the bottom thereof of the desulfurized or roasted ore along the central axis, and to this end a center discharge well 26 communicates with the bottom of the shaft furnace and is provided at its lower end with a door 27 for withdrawal of the desulfurized ore from the bottom of the well, An auxiliary preheating furnace or booster 28 is provided in the apparatus of Fig. 2 for assisting in preheating the air to the desired temperature for the proper control of the desulfurizing operation. The booster 28 may conveniently consist of a coal-fired preheating furnace in which the coils 29 of the hot air circuit are exposed to the heat of the hot products of combustion of the fire. Hot air may be introduced into the shaft furnace through either or both of the lower tuyères 11 and 12 by appropriate adjustment of their respective valves 14, and cold air may similarly be introduced into the shaft furnace through either or both of the upper sets of tuyères 9 and 10.

The practice of the improved method of desulfurization of the invention in the apparatus illustrated in Figs. 1 and 2 of the accompanying drawings is comparatively simple consisting, for the most part, of adding briquettes, or other appropriately agglomerated material, to the top of the furnace, removing the roasted or desulfurized briquettes from the bottom of the furnace and introducing air near the bottom and along the sides of the furnace in the proper proportions to maintain the desired aforementioned conditions of desulfurization. The contact between the air and the ore is excellent, and, due to the porosity of the briquetted or otherwise agglomerated material, the air is readily distributed through the entire mass of ore undergoing desulfurization. The nature of the shaft furnace is such that there can be no dead air spaces, and furthermore there is no dilution of unroasted ore with roasted ore as the roast nears completion.

The method of the invention is particularly adapted for the dead or sweet roasting of zinciferous materials, so that the roasted or desulfurized material is adapted to be utilized, without further treatment, in the manufacture of zinc oxide by the Wetherill process, or in the manufacture of spelter in the customary zinc distillation furnaces, or for any other purpose where roasted zinc sulphide ores are usable. Where the roasted product is to be employed in the manufacture of substantially lead-free zinc products, the roasting should be carried on until the fault sulfur in the charge is less than 3 per cent, and preferably not over 2 per cent. In roasting leaded zinciferous sulphide ores, where the roasted product is to be employed in the manufacture of leaded zinc products, such as leaded zinc oxide, the fault sulfur in the roasted product may be as high as 10 per cent, and in practice is frequently around 3 to 7 per cent. In any case, in accordance with the present invention, the appropriately agglomerated zinciferous ore in the form of lumps of substantial size, is roasted to effect such desulfurization of the sulphides as is required in the subsequent metallurgical treatment of the roasted material.

We claim:—

1. The process of desulfurizing finely divided zinciferous sulphide ores which comprises agglomerating the finely divided ore into lumps of substantial size, causing the agglomerated ore to progressively travel through a desulfurizing environment, and maintaining said desulfurizing environment by passing through the agglomerated ore a combustion supporting gas at least a portion of which is preheated.

2. The process of desulfurizing finely divided zinciferous sulphide ore which comprises agglomerating the finely divided ore into lumps of substantial size, causing the agglomerated ore to progressively travel through a desulfurizing environment, and maintaining said desulfurizing environment by passing through the agglomerated ore a combustion supporting gas at least a portion of which is preheated by the hot gaseous products resulting from the desulfurization.

3. The process of desulfurizing finely divided zinciferous sulphide ore which comprises agglomerating the finely divided ore into lumps of substantial size, causing the agglomerated ore to progressively travel through a desulfurizing environment under regulated desulfurizing conditions for effecting a gradual elimination of sulfur from the ore, and maintaining the aforementioned regulated desulfurizing conditions by passing through the agglomerated ore in a direction opposite to the direction of travel of the ore a combustion supporting gas at least a portion of which is preheated in part at least by the hot gaseous products resulting from the desulfurization.

4. The process of desulfurizing finely divided zinciferous sulphide ore which comprises agglomerating the finely divided ore into lumps of substantial size, causing the agglomerated ore to travel through a desulfurizing environment under regulated desulfurizing conditions for effecting the desired elimination of sulfur from the ore, and maintaining the aforementioned regulated desulfurizing conditions by passing through the agglomerated ore a combustion supporting gas at least a portion of which is preheated in part at least by the hot gaseous products resulting from the desulfurization.

5. The process of desulfurizing finely divided zinciferous sulphide ore which comprises agglomerating the finely divided ore into lumps of substantial size, causing the agglomerated ore to travel through a desulfurizing environment under regulated desulfurizing conditions for effecting a gradual elimination of sulfur from the ore and the production of a desulfurized product containing not over three per cent of fault sulfur, and maintaining the aforementioned regulated desulfurizing conditions by passing through the agglomerated ore a combustion supporting gas at least a portion of which is preheated in part at least by the hot gaseous products resulting from the desulfurization.

6. The process of desulfurizing finely divided zinciferous sulphide ore which comprises agglomerating the finely divided ore into lumps of substantial size, causing the agglomerated ore to progressively travel through a desulfurizing environment under regulated desulfurizing conditions for effecting the desired elimination of sulfur from the ore and the production of a desulfurized product suitable for subsequent metallurgical treatment, and maintaining the aforementioned regulated desulfurizing conditions by passing through the agglomerated ore a combustion supporting gas at least a portion of which is preheated in part at least by the hot gaseous products resulting from the desulfurization.

7. The process of desulfurizing finely divided zinciferous sulphide ore which comprises agglomerating the finely divided ore into lumps of substantial size, causing the agglomerated ore to travel through a desulfurizing environment under regulated desulfurizing conditions for effecting a gradual elimination of sulfur from the ore and the production of a gaseous product having a substantially uniform sulfur dioxide content of from about 5 to about 8 per cent and maintaining the aforementioned regulated desulfurizing conditions by passing through the agglomerated ore a combustion supporting gas at least a portion of which is preheated.

8. The process of desulfurizing finely divided zinciferous sulphide ore which comprises agglomerating the finely divided ore into lumps of substantial size, causing the agglomerated ore to progressively travel through a desulfurizing environment under regulated desulfurizing conditions for effecting a gradual elimination of sulfur from the ore and the production of a desulfurized product containing not over three per cent of fault sulfur, and maintaining the aforementioned regulated desulfurizing conditions by passing through the agglomerated ore in a direction approximately opposite to the direction of travel of the ore a combustion supporting gas at least a portion of which is preheated in part at least by the hot gaseous products resulting from the desulfurization.

9. The process of desulfurizing finely divided zinciferous sulphide ore which comprises agglomerating the finely divided ore into lumps of substantial size, causing the ore to progressively travel through a desulfurizing environment under regulated desulfurizing conditions, maintaining the aforementioned regulated desulfurizing conditions by passing through the ore a combustion supporting gas which is introduced into the ore at two or more different stages in its desulfurization, the portion of the combustion supporting gas introduced into the ore at a later stage in the desulfurization being at a considerably higher temperature than a portion of the combustion supporting gas introduced into the ore at an earlier stage in the desulfurization.

10. The process of desulfurizing finely divided zinciferous sulphide ore which comprises agglomerating the finely divided ore into lumps of substantial size, causing the agglomerated ore to progressively travel through a desulfurizing environment, maintaining said desulfurizing environment by passing through the agglomerated ore a combustion supporting gas at least a portion of which is preheated, and preheating said combustion supporting gas solely by heat derived from hot products resulting from the desulfurization.

11. The process of desulfurizing finely divided zinciferous sulphide ore which comprises agglomerating the finely divided ore into lumps of substantial size, causing the agglomerated ore to progressively travel through a desulfurizing environment under regulated desulfurizing conditions for effecting a gradual elimination of sulfur from the ore and the production of a gaseous product having a substantially uniform sulfur dioxide content of from about 5 to about 8 per cent, maintaining said regulated desulfurizing conditions by passing through the agglomerated ore a combustion supporting gas at least a portion of which is preheated, and preheating said combustion supporting gas solely by heat derived from hot products resulting from the desulfurization.

12. The process of desulfurizing finely divided zinciferous sulphide ore which comprises agglomerating the finely divided ore into lumps of substantial size, causing the agglomerated ore to progressively travel through a desulfurizing environment under regulated desulfurizing conditions for effecting a gradual elimination of sulfur from the ore and the production of a desulfurized product containing not over three per cent of fault sulfur, maintaining said regulated desulfurizing condition by passing through the agglomerated ore a combustion supporting gas at least a portion of which is preheated, and preheating said combustion supporting gas solely by heat derived from hot products resulting from the desulfurization.

13. The process of desulfurizing finely divided zinciferous sulphide ore which comprises agglomerating the finely divided ore into lumps of substantial size, causing the agglomerated ore to progressively travel through a desulfurizing environment under regulated desulfurizing conditions for effecting a gradual elimination of sulfur from the ore and the production of a desulfurized product containing not over three per cent of fault sulfur and the production of a gaseous product having a substantially uniform sulfur dioxide content of from about 5 to about 8 per cent, maintaining said regulated desulfurizing conditions by passing through the agglomerated ore a combustion supporting gas at least a portion of which is preheated, and preheating said gas solely by heat derived from hot products resulting from the desulfurization.

14. The process of desulfurizing finely divided zinciferous sulphide ore which comprises agglomerating the finely divided ore into lumps of substantial size, causing the agglomerated ore to progressively travel through a desulfurizing environment under regulated desulfurizing conditions for effecting a gradual elimination of sulfur from the ore and the production of a desulfurized product containing not over three per cent of fault sulfur and the production of a gaseous product having a substantially uniform sulfur dioxide content of from about 5 to about 8 per cent and maintaining the aforementioned regulated desulfurizing conditions by passing through the agglomerated ore a combustion supporting gas at least a portion of which is preheated.

15. The process of desulfurizing finely divided zinciferous sulphide ore which comprises agglomerating the finely divided ore into lumps of substantial size, causing the agglomerated ore to progressively travel through a desulfurizing environment under regulated desulfurizing conditions for effecting a gradual elimination of sulfur from the ore and the production of a gaseous product having a substantially uniform sulfur dioxide content of from about 5 to about 8 per cent and maintaining the aforementioned regulated desulfurizing conditions by passing through the ore a combustion supporting gas which is introduced into the ore at two or more different stages in its desulfurization, the portion of the combustion supporting gas introduced into the ore at a later stage in the desulfurization being at a considerably higher temperature than a portion of the combustion supporting gas introduced into the ore at an earlier stage in the desulfurization.

16. The process of desulfurizing finely divided zinciferous sulphide ore which comprises agglomerating the finely divided ore into lumps of substantial size, causing the agglomerated ore to progressively travel through a desulfurizing environment under regulated desulfurizing conditions for effecting a gradual elimination of sulfur from the ore and the production of a desulfurized product containing not over 3 per cent of fault sulfur, and maintaining the aforementioned regulated desulfurizing conditions by passing through the ore a combustion supporting gas which is introduced into the ore at two or more different stages in its desulfurization, the portion of the combustion supporting gas introduced into the ore at a later stage in the desulfurization being at a considerably higher temperature than a portion of the combustion supporting gas introduced into the ore at an earlier stage in the desulfurization.

17. The process of desulfurizing finely divided zinciferous sulphide ore which comprises agglomerating the finely divided ore into lumps of substantial size, causing the agglomerated ore to progressively travel through the desulfurizing environment under regulated desulfurizing conditions for effecting a gradual elimination of sulfur from the ore and the production of a desulfurized product containing not over 3 per cent of fault sulfur and the production of a gaseous product having a substantially uniform sulfur dioxide content of from above 5 to about 8 per cent, and maintaining the aforementioned regulated desulfurizing conditions by passing through the ore a combustion supporting gas which is introduced into the ore at two or more different stages in its desulfurization, the portion of the combustion-supporting gas introduced into the ore at a later stage in the desulfurization being at a considerably higher temperature than a portion of the combustion supporting gas introduced into the ore at an earlier stage in the desulfurization.

18. The process of desulfurizing finely divided zinciferous sulphide ore which comprises agglomerating the finely divided ore into lumps of substantial size, causing the agglomerated ore to progressively travel through a desulfurizing environment under regulated desulfurizing conditions for effecting the gradual elimination of sulfur from the ore and the production of a gaseous product having a substantially uniform sulfur dioxide content of from about 5 to about 8 per cent, maintaining the aforementioned regulated desulfurizing conditions by passing through the ore a combustion supporting gas which is introduced into the ore at two or more different stages in its desulfurization, the portion of the combustion supporting gas introduced into the ore at a later stage in the desulfurization being at a considerably higher temperature than a portion of the combustion supporting gas introduced into the ore at an earlier stage in the desulfurization, and preheating the portion of the combustion supporting gas of higher temperature in part at least by the hot gaseous products resulting from the desulfurization.

19. The process of desulfurizing finely divided zinciferous sulphide ore which comprises agglomerating the finely divided ore into lumps of substantial size, causing the agglomerated ore to progressively travel through a desulfurizing environment under regulated desulfurizing conditions for effecting a gradual elimination of sulfur from the ore and the production of a desulfurized product containing not over 3 per cent of fault sulfur, maintaining the aforementioned regulated desulfurizing conditions by passing through the ore a combustion supporting gas which is introduced into the ore at two or more different stages in its desulfurization, the portion of the combustion supporting gas introduced into the ore at a later stage in the desulfurization being at a considerably higher temperature than a portion of the combustion supporting gas introduced into the ore at an earlier stage in the desulfurization, and preheating the portion of the combustion supporting gas of higher temperature in part at least by the hot gaseous products resulting from the desulfurization.

20. The process of desulfurizing finely divided zinciferous sulphide ore which comprises agglomerating the finely divided ore into lumps of substantial size, causing the agglomerated ore to progressively travel through a desulfurizing environment under regulated desulfurizing conditions for effecting a gradual elimination of sulfur from the ore and the production of a desulfurized product containing not over 3 per cent of fault sulfur and the production of a gaseous product having a substantially uniform sulfur dioxide content of from about 5 to about 8 per cent, maintaining the aforementioned regulated desulfurizing conditions by passing through the ore a combustion supporting gas which is introduced into the ore in two or more different stages in its desulfurization, a portion of the combustion supporting gas introduced into the ore at a later stage in the desulfurization being at a considerably higher temperature than a portion of the combustion supporting gas introduced into the ore at an earlier stage in the desulfurization, and preheating the portion of the combustion supporting gas of higher temperature in part at least by the hot gaseous products resulting from the desulfurization.

In testimony whereof we affix our signatures.

FRANK G. BREYER.
JOHN P. HUBBELL.
DUNCAN M. KERR.